United States Patent [19]

Truebe et al.

[11] 4,431,340

[45] Feb. 14, 1984

[54] FISH ELEVATOR AND METHOD OF ELEVATING FISH

[75] Inventors: Jonathan Truebe, Mirror Lake; Michael S. Drooker, Sanbornville, both of N.H.

[73] Assignee: Lakeside Engineering, Mirror Lake, N.H.

[21] Appl. No.: 292,334

[22] Filed: Aug. 12, 1981

[51] Int. Cl.³ .............................................. E02B 8/08
[52] U.S. Cl. ....................................... 405/82; 405/96
[58] Field of Search ....................... 405/81, 82, 83, 87, 405/96, 104, 106

[56] References Cited

U.S. PATENT DOCUMENTS

| | | | |
|---|---|---|---|
| 1,591,450 | 7/1926 | Wheeler | 405/82 |
| 1,680,722 | 8/1928 | Bennett et al. | 405/82 |
| 2,102,629 | 12/1937 | Knerr | 405/82 |
| 3,377,805 | 4/1968 | Warner | 405/81 |

Primary Examiner—David H. Corbin
Attorney, Agent, or Firm—C. Yardley Chittick

[57] ABSTRACT

A means and method for transporting fish from a lower body of water to a higher body of water. The means comprises a tubular lock with a gated entrance below the level of the lower body of water through which fish may enter the lock and a discharge passage above the level of the upper body of water. The fish raising means in the lock is a crowder pulled upward by a surface float as water from the upper body of water gravitationally flows into the closed lock filling it to the level of the upper body. Water is then pumped into the lock to raise the level to the discharge passage. The crowder is then caused to float upward the remaining distance through the water to the level of the discharge passage by the introduction of air into a pocket on the underside of the crowder. The fish are then automatically discharged from the lock into the discharge passage by the out of water position of the crowder. The movement of the fish into the discharge passage is aided by the continuous overflow of water still being pumped into the lock. A pipe may be connected to the discharge passage to deliver the fish to a selected location in the upper body of water.

10 Claims, 6 Drawing Figures

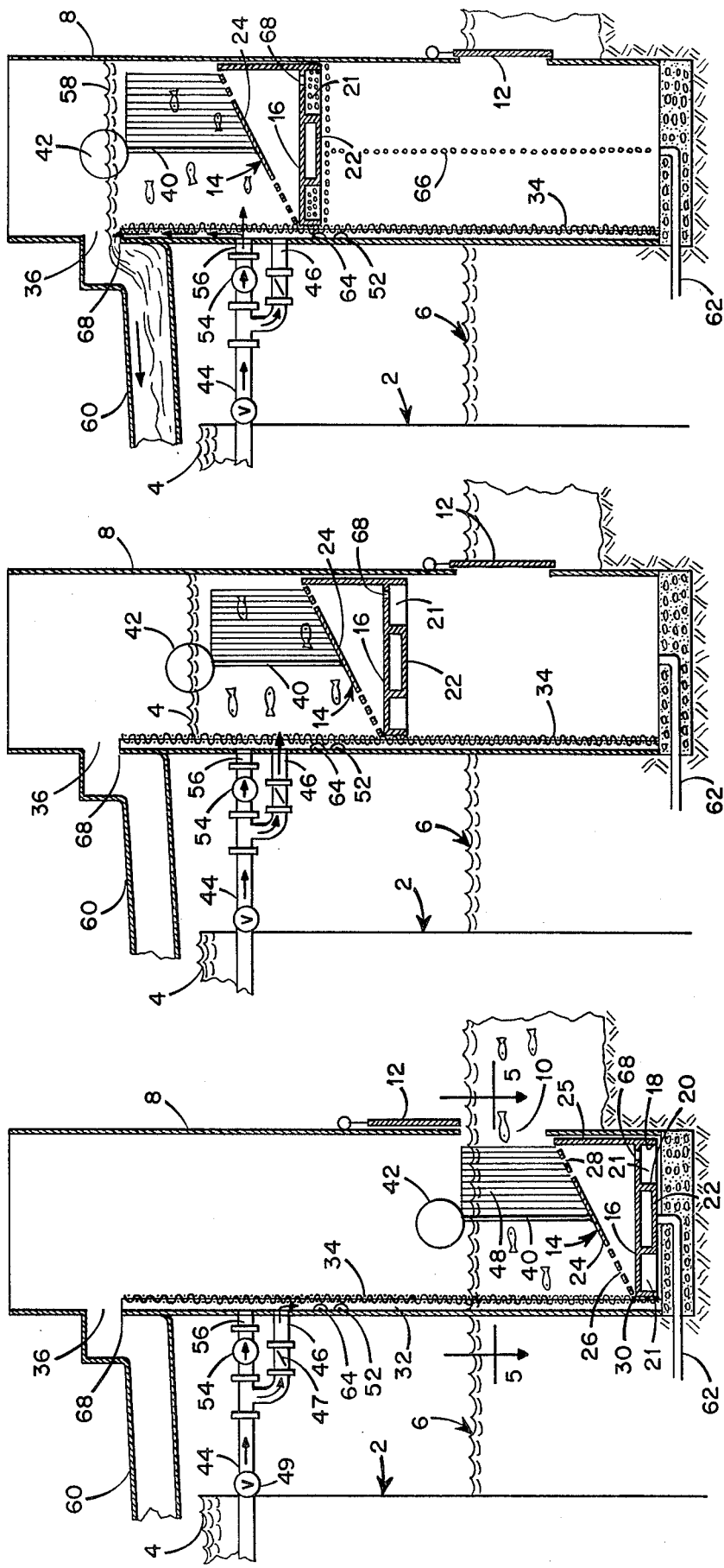

FISH ELEVATOR AND METHOD OF ELEVATING FISH

The Government has rights in this invention pursuant to Contract No. DE-AC07-80ID1220 awarded by the U.S. Department of Energy.

BACKGROUND OF THE INVENTION

Fishways, fishlocks or fish elevators for raising fish from a lower body of water to a higher body of water are old and well known. The purpose of such constructions is to provide means to enable fish to move upstream past dams or other obstructions which block their normal upstream passage. Typical prior art U.S. patents showing such constructions are as follows: Nos. 1,591,450, 1,680,722, 1,872,556, 2,626,505.

SUMMARY OF THE INVENTION

The present invention provides a relatively simple and inexpensive means and method for raising fish in a lock from a lower level body of water to a higher level body of water. The only moving mechanical parts are an air pump, a water pump and a gate for closing the lower end of the lock after fish have entered the lock and positioned themselves above the crowder. The structure is utilized to perform the following steps. With fish in the lock above the crowder, the gate is closed. Water continuously flowing into the lock from the upper level gradually fills the lock to the level of the upper body of water.

As the lock is filling, a float rigidly attached to and above the crowder rises with the water, lifting the crowder. This compels the fish to move up in the lock. There is insufficient space between the wall of the lock and the periphery of the crowder for the fish to escape to a position below the crowder.

When the limit of gravitational filling of the lock is reached, additional upper level water is them pumped into the lock, raising the water level and float to the level of the overflow or discharge passage which is a substantial distance above the level of the upper body of water. The crowder supported by the float is still below the surface with the fish now swimming in an adequate but smaller volume of water above the crowder.

Since it is not possible to raise the water level in the lock above the discharge passage, other means must be provided to move the crowder up above that level so that the fish can be delivered by the crowder into the discharge passage. This is accomplished by pumping air into an air pocket on the underside of the crowder. The air pocket is of such volume that when filled with air, the crowder floats to the surface of the water in the lock.

As will be better understood from the detailed specification which follows, the fish are directed by the sloping surface of the crowder as it arises from the water into the discharge passage and, preferably, into a pipe connected thereto which delivers the fish to a selected place in the upper body of water. The movement of the fish into the pipe is aided by the continuing outflow of water that is still being pumped into the lock.

As soon as all of the fish are out of the lock, the water pump and the air supply are shut off, and the gate at the lower end of the lock is slowly opened causing the water level in the lock to fall carrying with it the floating crowder. Alternatively, other means apart from the gate such as a discharge valve (not shown) at the bottom of the lock could be used to drain the water. Means is provided to evacuate the air under the crowder so the latter can settle to the bottom of the lock ready to begin the next cycle.

From the above, it will be understood that by having the overflow passage at the top of the lock well above the level of the upper body of water and by providing by pumping means a continuous flow of water into the discharge pipe, the fish may easily be carried through the pipe and distributed into the upper body of water in a positive and economical manner not heretofore available.

The invention will be better understood as the description proceeds with the aid of the accompanying drawing in which FIG. 1 is a vertical section of the invention showing the crowder at its lowermost position and the gate open, FIG. 2 is a view similar to FIG. 1 but with the bottom gate closed and the lock filled by gravity flow to the level of the upstream water surface, FIG. 3 is a view similar to FIGS. 1 and 2 in which the water level in the lock has been raised to the overflow level at the discharge passage by pumping in upstream water, FIG. 4 is a view similar to FIGS. 1, 2 and 3 but showing the position of the crowder after having floated to the top of the water in the lock by the introduction of air in the bottom pocket in the crowder, FIG. 5 is a horizontal section taken on the line 5—5 of FIG. 1, FIG. 6 is a section taken on the line 6—6 of FIG. 4.

DESCRIPTION OF A PREFERRED EMBODIMENT

Figure 4:
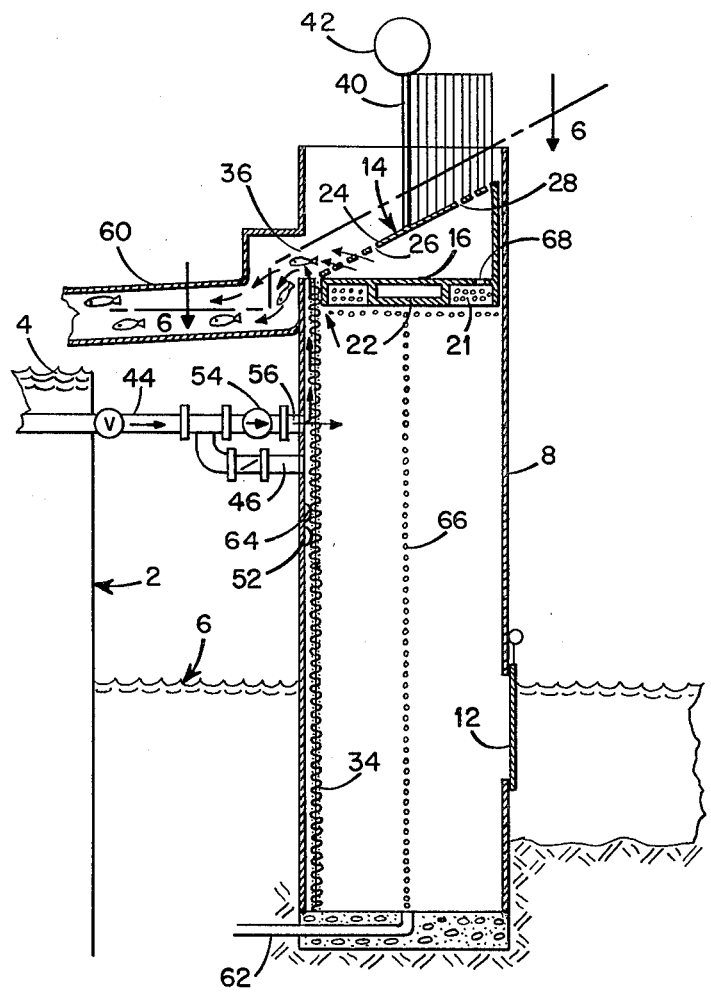

Referring first to FIG. 1, 2 represents a dam which has caused the upstream water to reach the level 4. The level of the downstream water below the dam is indicated at 6.

At any suitable position, usually to one side of the dam or obstruction, there is provided a lock 8. The lock, ordinarily cylindrical, may be made of any suitable material such as for example sheet steel, or reinforced concrete. As shown it will be assumed that the lock is of sheet steel of adequate strength to contain the water.

The size of the lock is a matter of choice depending upon the number of fish to be raised. A lock 8 feet diameter might be adequate to raise 5,000 fish per day. A 15 foot diameter lock could handle an estimated 20,000 fish per day.

Near the lower end of the lock below the level of the water 6 is an entrance 10 closeable by a gate 12 which in FIG. 1 is shown in open position. In the lock and sitting on the bottom thereof is a crowder 14, so named because as it moves upwardly in the lock, it crowds the fish thereabove in the available volume of water. The crowder is comprised of a circular bottom plate 16 from which depends a short circular wall 18. In the center is a smaller circular wall 20 closed by plate 22. Thus the plate 16 and the walls 18 and 20 define a doughnut-shaped space 21 on the underside of plate 16 large enough when filled with air to float the crowder.

The upper part of the crowder comprises a sloping plate 24 having multiple perforations therethrough at the lower part as at 26 and at the upper part as at 28. Plate 24 is supported by a circular wall 25 mounted on plate 16. The lower edge of plate 24 meets with plate 16 along a straight horizontal line as at 30. This provides a segmental space 32 between the crowder and the wall of the lock whereby a vertical screen 34 may be installed for the full height of the lock to the overflow or discharge passage 36.

Figure 5:
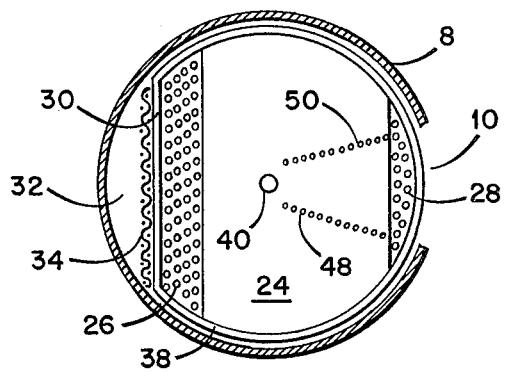
Figure 6:
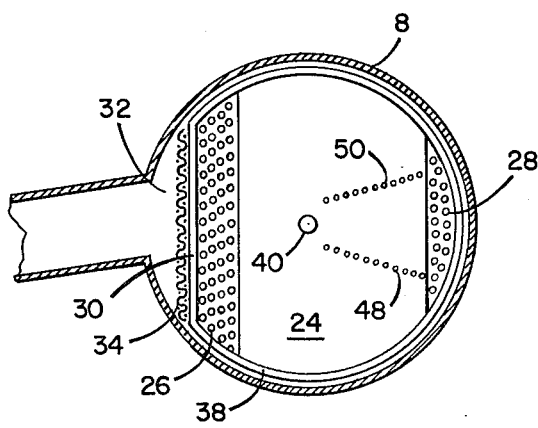

The crowder fits within the lock 8 for easy vertical movement but to insure against fish working their way down past the crowder, a seal of any suitable material may be provided as indicated at 38 in FIGS. 5 and 6.

Rigidly mounted on the center of crowder plate 24 is a vertical rod 40 carrying on its upper end a float 42. The length of the rod 40 is such that when the crowder is sitting on the bottom of the lock as in FIG. 1, the float 42 will be enough above the water level 6 to have no lifting effect on the crowder. When the water level rises in the lock, float 42 will rise with the water and lift the crowder.

A water supply pipe 44 fed by the upper body of water constantly feeds water into the lock through pipe 46 at a moderate rate. A check valve 47 is provided for preventing backflow. A shut off valve 49 is provided in pipe 44 for shutting off the flow from the upper body if necessary. With gate 12 open, the water falling from pipe 46 into the water in the lock causes a current through the lock that is attractive to fish outside the entrance 10. Accordingly fish tend to swim into the lock and in so doing pass between two converging rows of vertical rods 48 and 50. This rod arrangement is a common expedient used in fish traps and acts effectively to hold the fish in the lock above the crowder.

As soon as it is determined that a sufficient number of fish are in the lock, the gate 12 is lowered to close entrance 10. The gate may be manually or mechanically operated. Preferably it will be controlled by conventional means (not shown) set in motion by a timer adjusted to provide adequate time for a substantial number of fish to enter the lock.

With the entrance 10 closed by gate 12, the water level in the lock, fed by supply pipe 46 rises carrying float 42 and the suspended crowder 14 with it. The fish are now entrapped in the rising water above plate 24. The rising water level would normally stop when the level reaches the level 4 of the upper body of water as suggested in FIG. 2. However, before then, a pressure switch 52 or other known means places a pump 54 in operation to continue the feeding of water from pipe 44 into the lock through pipe 56. As a result the water in the lock continues to rise to reach discharge passage 36 at a level 58 as shown in FIG. 3 and then with pump 54 continuing in operation, water continuously overflows into pipe 60 to be discharged into the upper body of water at any place to which pipe 60 may be directed. As can be seen in FIG. 3, the fish are still entrapped between the crowder and the water surface 58. The float 42 cannot raise the crowder any farther but the crowder must be raised to the level of the discharge passage if the fish are to be delivered to the pipe 60.

This final raising of the crowder from the position of FIG. 3 to that of FIG. 4 is accomplished by novel means.

Referring to the several figures, it will be seen that there is a pipe 62 in the base of the lock connected to a source of compressed air. When the water level has reached the position shown in FIG. 2, the pump 54 as explained above has gone into operation. At a suitable time another control such as pressure switch 64 for example puts the compressed air supply in operation to feed air through pipe 62 into the water at the bottom of the lock.

The air in the form of bubbles as suggested at 66 in FIG. 3 rises through the water in a substantially vertical path to engage the central bottom plate 22, then spread laterally to enter the doughnut-shaped pocket 21. When the pocket is filled with air, the entire crowder including the float 42 will be buoyant and will float up through the water to reach the position shown in FIG. 4.

As the upper part of the crowder breaks through the surface at level 58 indicated in FIG. 3, air enters through the openings 28 in the upper part of plate 24 and water under plate 24 begins to flow out through openings 26.

Simultaneously as the plate 24 emerges, the fish thereabove in only a minimum of water are guided by the sloping plate toward the passage 36. The fish aided by the water escaping through openings 26 and the continuous waterfall over the edge 68 due to the continued operation of pump 54 are compelled to enter pipe 60 and to move therethrough by the flowing water. As mentioned previously, the pipe may have its discharge end at a place remote from the dam so that the fish when reaching the upper body of water will be is a safe location.

After all of the fish have been discharged from the lock, the circuits controlling the pump 54 and the air supply to pipe 62 may be simultaneously opened and the gate 12 raised a limited distance. This will permit water to escape from the lock at a suitable rate to gradually lower the level from level 58 to the original level 6.

At the outset of the fall of lock level, the crowder is still floating as in FIG. 4. Means for permitting the escape of air from the pocket is provided, one such means being a small hole 66 in plate 16 therein, through which air is continuously escaping. As the water level drops, the air in pocket 21 is gradually dissipated so that by the time the water level has dropped to level 6, the crowder has sunk to its original position as shown in FIG. 1. The gate 12 by this time has also been fully opened and the fish raising operation is ready to be repeated.

While the means for raising the crowder to the level of the discharge passage is preferably flotation means as disclosed, nevertheless it is to be understood that mechanical means for raising the crowder from the bottom of the lock all the way to the level of the discharge passage could be used as an equivalent.

It is intended to cover all changes and modifications of the example of the invention herein chosen for purposes of the disclosure which do not constitute departures from the spirit and the scope of the invention.

I claim:

1. A fish elevator for raising fish from a lower body of water to an upper body of water, said elevator comprising
   a lock having its lower end below the surface of a lower body of water and having an upper discharge passage substantially above the surface of an upper body of water,
   a gate in said lock which when open will provide an entrance from said lower body of water into said lock,
   a vertically movable crowder in said lock which when in down position will be below said entrance whereby when said gate is open fish may swim from said lower body of water through said entrance into said lock above said crowder, means for closing said gate when fish are in said lock above said crowder, means for admitting water from said upper body of water into said lock when said gate is closed, means for filling said lock to the level of said discharge passage, means for causing continuous flow of water from said lock into said discharge passage and, first and second means for moving said crowder above which said fish are located from its lowermost position to a position at least to the level of the water at said discharge passage, whereby fish above said crowder will be directed into said discharge passage.

2. A fish elevator as set forth in claim 1, said means for moving said crowder from its lowermost position to the level of said discharge passage comprising first flotation means for raising said crowder as said water level rises while maintaining said crowder a constant distance below the rising water level, and second flotation means for floating said crowder to the surface of the water after the water level has reached the level of said discharge passage.

3. A fish elevator as set forth in claim 2, the said first flotation means comprising a float attached to and above said crowder and, said second flotation means comprising an air pocket on the underside of said crowder and means for filling said pocket with air after the water level and said first flotation means have reached the level of said discharge passage.

4. The fish elevator set forth in claim 1, and a vertical passage along the wall of said lock defined by a vertical screen adjacent the path traveled by said crowder.

5. A fish elevator as set forth in claim 2, said crowder comprising a sloping plate with perforations at its top and bottom, and means for directing the slope of said plate toward said discharge passage as said crowder is raised from the water by said second flotation means.

6. A fish elevator as set forth in claim 2, and means for preventing angular rotation of said crowder in said lock as the crowder is raised by said first and second flotation means.

7. A fish elevator as set forth in claim 6, said means for preventing angular rotation of said crowder comprising shaping said crowder so as to provide a segmental space between said crowder and said lock, and a screen fixed to and extending vertically of said lock adjacent the segmental edge of said crowder, said screen being aligned with said discharge passage, said segmental space providing a passage for flow of water past said crowder into said discharge passage when said crowder is at its highest position in said lock.

8. A fish elevator as set forth in claim 1, and means for preventing angular rotation of said crowder in said lock as the crowder is raised from its lowermost position to a position at the level of said discharge passage, said means for preventing angular rotation of said crowder comprising shaping said crowder so as to provide a segmental space between said crowder and said lock, and a screen fixed to and extending vertically of said lock adjacent the segmental edge of said crowder, said screen being aligned with said discharge passage, said segmental space providing a passage for flow of water past said crowder into said discharge passage when said crowder is at its highest position in said lock.

9. For use in the lock of a fish elevator, a vertically movable crowder having its periphery shaped for free vertical movement within the walls of said lock, said crowder comprising a sloping plate with perforations at its top and bottom, a horizontal plate below said sloping plate, the space between said sloping plate and said horizontal plate enclosed by a continuous wall secured to the peripheries of said plates, whereby when said crowder is moved upward through the water in said lock, said enclosed space will be filled with water but when said crowder is moved above the surface of the water in said lock air will enter said top perforations and water in said enclosed space will flow out through the said bottom perforations in said plate and then downwardly over the sloping upper surface of said plate.

10. The method of elevating a plurality of fish from a lower body of water to a higher body of water, said method comprising the steps of entrapping said fish in a lock with the water at said lower level, gravitationally filling said lock with water from said higher body of water to the level of said higher body while simultaneously raising a false bottom having a sloping upper surface to compel said fish to be in the upper part of the water in said lock, pumping more water into said lock to raise the water to the level of an overflow discharge passage substantially above the level of said upper body of water, causing water to flow continuously from said lock into said discharge passage, and simultaneously raising said false bottom to the level of the water at said discharge passage and directing said sloping upper surface toward said discharge passage whereby all fish above said sloping upper surface will be directed out of said lock into said discharge passage by the continuous flow of water from said lock.

* * * * *